(12) United States Patent
Lautenschlager

(10) Patent No.: US 7,241,248 B2
(45) Date of Patent: Jul. 10, 2007

(54) VARIATOR ARRANGEMENT FOR A TRANSMISSION

(75) Inventor: Dirk Lautenschlager, Ostfildern (DE)

(73) Assignee: Getrag Getriebe-und Zahnradfabrik Hermann Hagenmeyer GmbH & Cie KG, Untergruppenbach (DE)

(*) Notice: Subject to any disclaimer, the term of this patent is extended or adjusted under 35 U.S.C. 154(b) by 0 days.

(21) Appl. No.: 11/325,978

(22) Filed: Jan. 5, 2006

(65) Prior Publication Data
US 2006/0122029 A1 Jun. 8, 2006

Related U.S. Application Data

(63) Continuation of application No. PCT/EP2004/007418, filed on Jul. 7, 2004.

(30) Foreign Application Priority Data
Jul. 11, 2003 (DE) ................. 103 32 184

(51) Int. Cl.
*F16H 15/38* (2006.01)
(52) U.S. Cl. ........................ 476/42; 403/355
(58) Field of Classification Search .............. 476/40, 476/42; 403/355, 356
See application file for complete search history.

(56) References Cited

U.S. PATENT DOCUMENTS

| | | |
|---|---|---|
| 3,394,617 A | 7/1968 | Dickenbrock |
| 3,727,474 A | 4/1973 | Fullerton |
| 4,756,211 A * | 7/1988 | Fellows ............... 475/209 |
| 5,680,979 A * | 10/1997 | Weis ................ 226/111 |
| 6,312,358 B1 * | 11/2001 | Goi et al. ............ 477/37 |

FOREIGN PATENT DOCUMENTS

| | | |
|---|---|---|
| DE | 171098 | 6/1906 |
| DE | 840 339 | 6/1952 |
| DE | 873 782 | 4/1953 |
| DE | 199 29 207 A1 | 6/1999 |
| DE | 199 62 694 A1 | 7/2000 |
| DE | 100 50 340 A1 | 10/2000 |
| DE | 102 24 875 A1 | 6/2002 |
| JP | 2001-295904 | 10/2001 |

* cited by examiner

*Primary Examiner*—David M. Fenstermacher
(74) *Attorney, Agent, or Firm*—Knobbe Martens Olson & Bear LLP

(57) ABSTRACT

A variator arrangement is provided for a continuously variable transmission, having a shaft, a variator disk connected in a rotationally fixed manner to the shaft and a support disk which is concentric with said variator disk and which is rigidly connected to the shaft, the variator disk having a traction area on the side facing away from the support disk. For a rotationally fixed connection between the variator disk and the shaft, the variator disk and the support disk each have at least one recess which in cross section are each of approximately concave design and together hold a positive connection element which in cross section is of approximately convex lens-shaped design (FIG. 2).

6 Claims, 2 Drawing Sheets

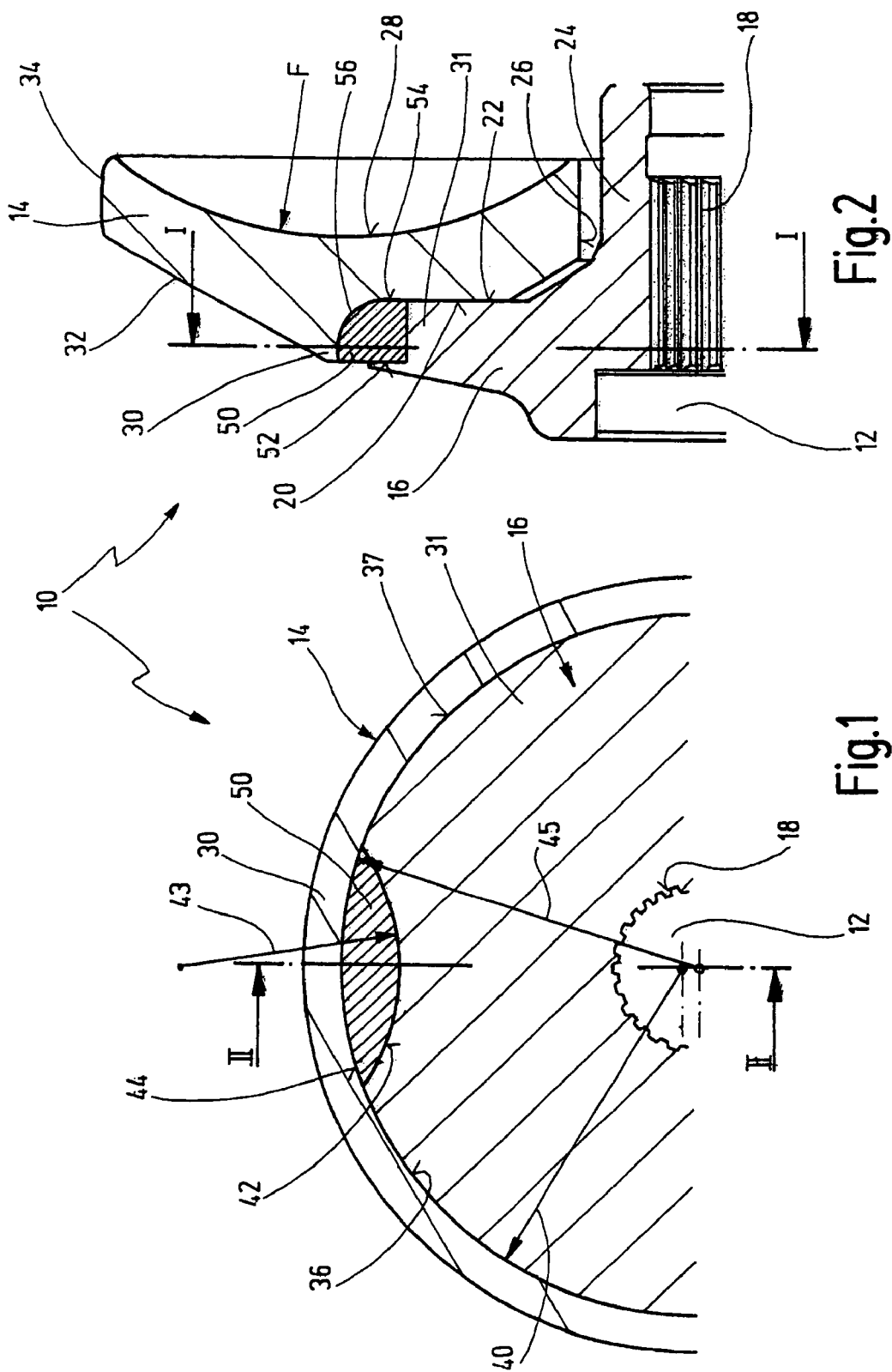

VARIATOR ARRANGEMENT FOR A TRANSMISSION

CROSS REFERENCE TO RELATED APPLICATIONS

This application is a continuation of International Application PCT/EP2004/007418, filed on Jul. 7, 2004. The entire disclosure of this application is incorporated by reference in its entirety.

BACKGROUND OF THE INVENTION

1. Field of the Invention

The present invention relates to a variator arrangement for a continuously variable transmission, having a shaft, a variator disk connected in a rotationally fixed manner to the shaft and a support disk which is concentric with said variator disk and which is rigidly connected to the shaft, the variator disk having on the side facing away from the support disk a traction area for transmitting torque.

2. Description of the Related Art

Variator arrangements of this type are used in toroidal transmissions but also for example in CVT transmissions.

Toroidal transmissions have at least one variator with two variator disks. The disks have annular traction areas which face one another and which define a toroidal space. Rollers are arranged within the toroidal space and engage with the variator disks in order to transmit a torque from one variator disk to the other variator disk. Toroidal transmissions of this type are generally known.

In order to transmit torque, the variator disks in the prior art are normally connected to the shaft in the hub region in a positive manner by means of gear toothings.

The high axial contact forces, particularly during displacement of the rollers, cause high loading of the variator disks in the vicinity of the gear toothing. This may lead to excessive stresses and consequently cause failure.

Furthermore, the production of the gear toothings is costly, particularly since the variator disk material is normally a high strength antifriction bearing steel.

In order to be able to better absorb the high axial forces, a variator disk is often assigned a support disk which is arranged on the opposite side of the variator disk from the traction area. The support disk allows the variator disk to be of lower mass and weight and, as a result, costs are saved. The support disk is in this case normally connected to the shaft in a positive manner in the circumferential direction. This connection is possible by means of gear toothing, though the support disk may also be formed in one piece with the shaft.

Although it is also conceivable to connect the variator disk to the shaft by means of gear toothing in the hub region when using a support disk, it is however preferred for the torque to be transmitted from the variator disk to the shaft by means of the support disk.

This may generally occur by means of non-positive connection. This is because the high axial contact forces may be utilized for transferring torque given a suitable design of axial bearing surfaces on the support disk and on the variator disk. In this case, use is made of the steel/steel frictional coefficient in the bearing region.

The transmission of torque from the variator disk to the support disk may however also occur in a positive manner. In this case, it is generally conceivable to join the variator disk in a positive manner on to the hub region of the support disk. In order to reduce the tangential forces, it is however more for the torque to be transferred in the outer circumferential region of the support disk or of the variator disk.

Although it is likewise generally conceivable here to provide gear toothing in the outer circumferential region, it is however considered to be more to implement positively connecting elements such as spheres in corresponding radial recesses both of the support disk and of the variator disk.

These approaches have in common the fact that excessive stresses may occur on account of the notch effect in the region of the positive connection between the variator disk and support disk.

It is hence the object of the present invention to specify a variator arrangement in which a positive connection between the variator disk and the support disk is improved.

SUMMARY OF THE INVENTION

This object is achieved in the case of the variator arrangement mentioned in the introduction by virtue of the fact that, for a rotationally fixed connection between the variator disk and the shaft, the variator disk and the support disk each have at least one recess which in cross section are each of approximately concave design and together hold a positive connection element which in cross section is of approximately convex lens-shaped design.

This measure allows a positive connection between the variator disk and the support disk to be realized without excessive notch stresses occurring in the region of this connection. The geometries of the concave recesses and of the convex lens-shaped positive connection element have low notch sensitivity.

Furthermore, no gear toothing is required between the variator disk and the support disk. In this way, a trade-off between material hardness and subsequent machining in the hard state is unnecessary.

In addition, the geometries of the variator disk and of the support disk may be produced simply and cost-effectively.

The reduced occurrence of excessive stresses means in particular that the variator disk may be of lower mass and that the variator arrangement may be shorter in overall length in the axial direction.

Consequently, the abovementioned object is achieved in its entirety.

In a preferred embodiment, the variator disk or the support disk has an annular collar which overlaps a respective mating section of the support disk or of the variator disk.

In this embodiment, the high axial contact forces may be transmitted from one disk to the other in a particularly and material-sparing manner.

This is the case in particular when the variator disk has the annular collar which overlaps a mating section of the support disk. It is particularly advantageous in the case of a variator arrangement for a toroidal transmission if the annular collar is situated at approximately the level of the reference circle of the toroid.

In the case of this embodiment it is also of particular preference that the recess of the variator disk is formed on the inner circumference of the annular collar and the recess of the support disk is formed on the outer circumference of the mating section.

As a result, the recesses on the variator disk and on the support disk may be realized particularly easily.

According to a further preferred embodiment, the positive connection element is rounded off at least one edge which points toward the variator disk and the associated recess of the variator disk is correspondingly rounded.

As a result, the notch stresses occurring in the transition region from the variator disk to the support disk may be reduced further still.

It is self evident that it is of particular preference that the recesses and positive connection elements are arranged in the region of the outer circumference of the support disk or of the variator disk. As a result, stresses in the hub region of the variator disk may be reduced, so that the component thickness may be reduced. The overall result is a reduced weight and a reduction in the moment of inertia.

It is self evident that the features mentioned above and to be explained in the following may be implemented not only in the respectively specified combination, but also in other combinations or individually, without departing from the scope of the present invention.

Exemplary embodiments of the invention are described in more detail in the following description and are illustrated in the drawing, in which:

BRIEF DESCRIPTION OF THE DRAWINGS

FIG. 1 shows a schematic cross-sectional view through an exemplary embodiment of a variator arrangement according to the invention;

FIG. 2 shows a sectional view along the line II—II from FIG. 1; and

DETAILED DESCRIPTION OF PREFERRED EMBODIMENTS

Figure 3:
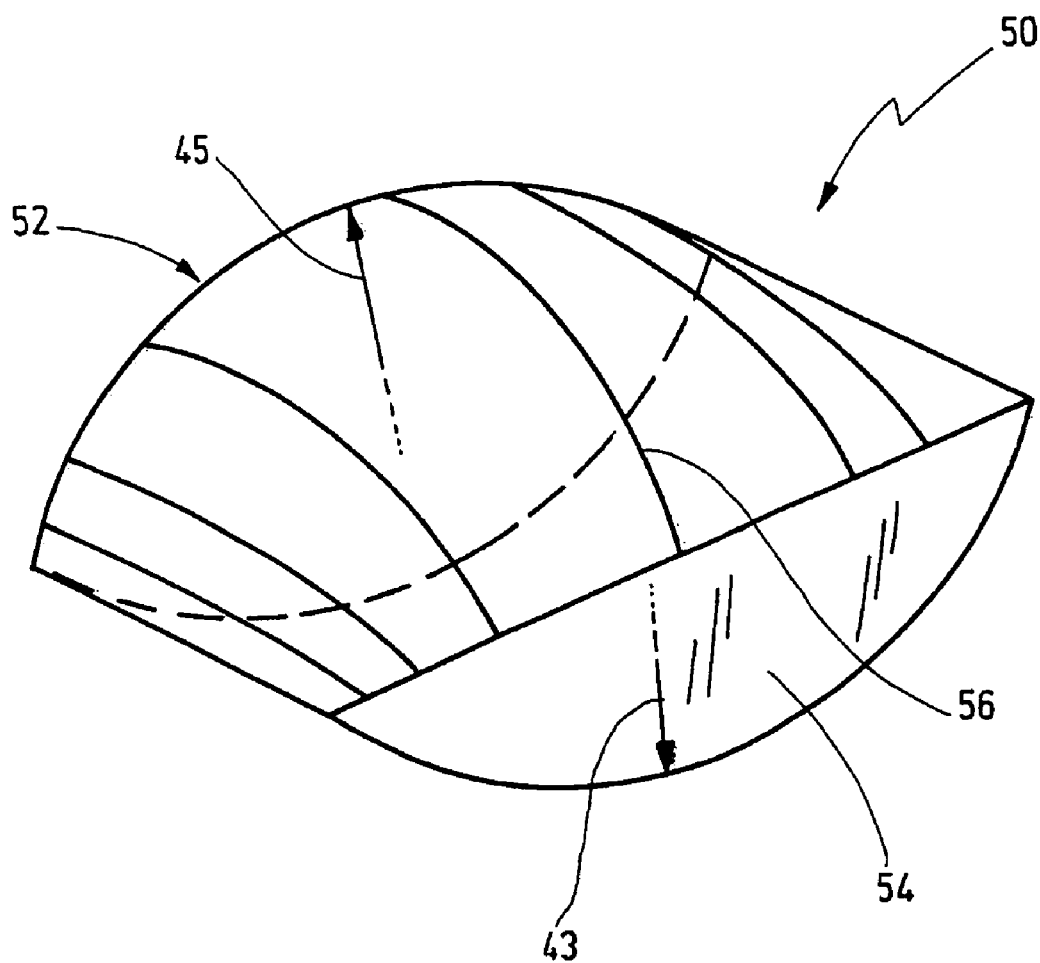
FIG. 3 shows in perspective form a schematic illustration of a preferred configuration of a positive connection element for the variator arrangement of FIGS. 1 and 2.

A preferred embodiment of a variator arrangement 10 according to the invention is illustrated in FIGS. 1 and 2.

The variator arrangement 10 is mounted on a shaft 12. In the illustrated embodiment, the shaft 12 is an input or output shaft of a toroidal transmission. The variator arrangement according to the invention may however also be implemented to the same degree in CVT transmissions or in other transmissions.

The variator arrangement 10 has a variator disk 14 arranged concentrically with the shaft 12 and has a support disk 16 which is likewise arranged concentrically with the latter.

The support disk 16 is connected to the shaft 12 in a positive manner by means of a splined profile 18 in its hub region.

The variator disk 14 and the support disk 16 bear against one another in the axial direction. In this case, an end side bearing surface 20, which is aligned transversely to the axial direction, of the variator disk 14 and a corresponding bearing surface 22 of the support disk 16 are in contact.

The support disk 16 has in the hub region a shoulder 24 which projects toward the variator disk 14. The shoulder 24 serves for receiving the inner gear toothing and for centering on the shaft 12. The support disk 16 may however also be constructed without a shoulder in the hub region.

The dimensions of the inner circumference 26 of the variator disk 14 and of the outer circumference of the shoulder 24 are in this case chosen such that substantially no force or torque transmission occurs via this bearing region. In particular, the inner circumference 26 does not bear against the outer circumference of the shoulder 24.

The variator disk 14 has on the end side facing away from the support disk 16 an annular traction area 28 which runs around the shaft 12. The traction area 28 is in this case formed in such a way that it forms a toroidal space together with a corresponding traction area 28 of an associated variator disk (not shown).

At approximately the level of the reference circle of the toroid, the variator disk 14 has a collar 30 which is aligned in the direction of the support disk 16. The collar 30 overlaps the outer diameter of the support disk 16, or more accurately an opposing section 31 (illustrated in FIG. 1) in the region of the outer circumference of the support disk 16.

From the collar 30, the rear contour of the variator disk 14 approximately follows the toroidal geometry, as shown by 32. The rear side extends as far as the outer circumference 34 of the variator disk 14.

The inner circumference 36 of the collar 30 bears circumferentially tightly against the outer circumference 37 of the mating section 31 in order to absorb additional stress peaks in the variator disk. The variator disk 14 is hence centered by means of the outer circumference 37 of the mating section 31 of the support disk 16.

The mutually corresponding radii of the outer circumference 37 of the support disk 16 and of the inner circumference 36 of the collar 30 of the variator disk 14 are represented by 40 in FIG. 1.

The mating section 31 of the support disk 16 has a multiplicity of recesses 42 of concave cross section distributed about its circumference, only one of which recesses 42 is illustrated in FIGS. 1 and 2 for the sake of clarity.

The radius 43 of the concave recess 42 is smaller than the radius 40. The radii 43, 40 may however also be approximately equal in magnitude. Furthermore, it is generally also conceivable that the radius 43 is larger than the radius 40.

In a corresponding manner, the variator disk 14 has recesses 44 of concave cross section on the inner circumference 36 of its collar 30, only one of which recesses is again illustrated in FIGS. 1 and 2.

The recesses 42, 44 are of approximately equal length in the circumferential direction. The radius 45 of the concave recess 44 on the inner circumference 36 of the collar 30 is in this case at least slightly larger than the radius 40.

The recesses 42, 44 together form one complete recess into which a positive locking element 50 with a convex lens-shaped cross section is inserted.

The positive locking element 50 rests in the axial direction on the bearing surface 20 of the variator disk 14. A flange (not illustrated in more detail in FIG. 2) which projects in the radial direction is provided on the support disk 16. The positive locking element 50 secured against this flange preventing it from falling out in the axial direction. The positive locking element 50 is slightly narrower in the axial direction than the recess 42 in order to avoid axial forces acting on the flange.

The radii of the concave geometry of the positive locking element 50 correspond in this case to the radii 43, 45 of the recesses 42 and 44 respectively.

As may be seen in particular in FIG. 3, the positive locking element 50 has a first end side 52 which lies opposite the support disk 16. The first end side 52 is of substantially planar form. As a result, the positive locking element 50 has two curved edges (not illustrated in more detail) in the region of the end side 52.

The opposite end side 54 of the positive locking element 50 is of planar form only in its lower region. Consequently, the positive locking element 50 has in the region of the end side 54 a curved edge whose profile is defined by the radius 43.

The corresponding upper edge is on the other hand rounded off as indicated by 56 in FIG. 3 and FIG. 2.

Axial forces acting on the traction area 28 of the variator disk 14, as shown by F in FIG. 2, are applied to the support disk 16 via the bearing surfaces 20, 22 and also via the collar 30 and the mating section 31. The support disk 16 rests in the axial direction on a step of the shaft 12. As a result of the geometry of the convex lens-shaped positive locking element 50 having low notch sensitivity, this force transmission does not cause excessive local stresses, even in the region of the positive locking element 50.

The positive locking elements 50 serve for transmitting torque from the variator disk 14 to the support disk 16 (or vice versa). During this loading in the circumferential direction, the geometry of the convex lens-shaped positive locking elements 50, which has low notch sensitivity, does not cause excessive local stresses.

Furthermore, the positive connection between the variator disk 14 and the support disk 16 can take place over a relatively large area, the recesses 42, 44 only requiring little removal of material and hence only causing a slight degree of weakening of the respective elements. In addition, the recesses 42, 44 are substantially completely filled again by the positive locking element 50 so that there is in fact virtually no material weakening but movement of the individual parts is possible.

Stresses in the hub region of the variator disk 14 are reduced by the positive transmission of torque in the circumferential region of the support disk 16. In this way, the variator disk 14 may be less thick, resulting in a reduced weight and a reduced moment of inertia.

A similar stress level to that in a complete disk may be achieved by means of the radial support of the collar 30 on the support disk 16 at approximately the level of the reference circle of the toroid. As a result of its two-part design, the complete disk 14, 16 may be produced more cost-effectively overall, an expensive material being selected for the variator disk 14 but a cost-effective material being selected for the support disk 16.

What is claimed is:

1. A variator arrangement for a continuously variable transmission, having a shaft, a variator disk connected in a rotationally fixed manner to the shaft only via a support disk which is concentric with said variator disk and which is rigidly connected to the shaft, the variator disk having a traction area on the side facing away from the support disk,
   wherein, for the rotationally fixed connection between the variator disk and the shaft, the variator disk and the support disk each have at least one recess which in cross section each comprise a concave shape and together hold a positive connection element which in cross section comprises a convex lens shape.

2. The variator arrangement as claimed in claim 1, wherein the variator disk has an annular collar which overlaps a mating section of the support disk.

3. The variator arrangement as claimed in claim 1, wherein the support disk has an annular collar which overlaps a mating section of the variator disk.

4. The variator arrangement as claimed in claim 2, wherein the recess of the variator disk is formed on the inner circumference of the annular collar and the recess of the support disk is formed on the outer circumference of the mating section.

5. The variator arrangement as claimed in claim 3, wherein the recess of the variator disk is formed on the inner circumference of the annular collar and the recess of the support disk is formed on the outer circumference of the mating section.

6. The variator arrangement as claimed in claim 1, wherein the positive connection element is rounded off at least one edge which points toward the variator disk and the recess of the variator disk is correspondingly rounded.

* * * * *